(12) United States Patent
Sekharan et al.

(10) Patent No.: US 11,816,684 B2
(45) Date of Patent: Nov. 14, 2023

(54) METHOD, APPARATUS, AND COMPUTER-READABLE MEDIUM FOR DETERMINING CUSTOMER ADOPTION BASED ON MONITORED DATA

(71) Applicant: Informatica LLC, Redwood City, CA (US)

(72) Inventors: Ansa Sekharan, Saratoga, CA (US); Ashok Gunasekaran, Saratoga, CA (US); Kali Prasad Vittala, Bangalore (IN); Arjun Krishnamoorthy, Bangalore (IN); Vivekanand Kompella, Sunnyvale, CA (US); Rengarajan Margasahayam, Sunnyvale, CA (US)

(73) Assignee: Informatica LLC, Redwood City, CA (US)

( * ) Notice: Subject to any disclaimer, the term of this patent is extended or adjusted under 35 U.S.C. 154(b) by 210 days.

(21) Appl. No.: 16/578,719

(22) Filed: Sep. 23, 2019

(65) Prior Publication Data

US 2021/0090095 A1  Mar. 25, 2021

(51) Int. Cl.
    *G06Q 30/0201* (2023.01)
    *G06N 20/00* (2019.01)
(52) U.S. Cl.
    CPC ......... *G06Q 30/0201* (2013.01); *G06N 20/00* (2019.01)
(58) Field of Classification Search
    None
    See application file for complete search history.

(56) References Cited

U.S. PATENT DOCUMENTS

| 2005/0283394 A1* | 12/2005 | McGloin ............... G06Q 10/10 705/7.32 |
| 2015/0302436 A1* | 10/2015 | Reynolds ........... G06Q 30/0201 705/7.32 |

(Continued)

OTHER PUBLICATIONS

Sung, B. Zhang, C. Y. Higgins and Y. Choe, "Data-Driven Sales Leads Prediction for Everything-as-a-Service in the Cloud," 2016 IEEE International Conference on Data Science and Advanced Analytics (DSAA), Montreal, QC, Canada, 2016, pp. 557-563 (Year: 2016).*

*Primary Examiner* — Chesiree A Walton
(74) *Attorney, Agent, or Firm* — Amardeep S. Grewal; Reed Smith LLP

(57) ABSTRACT

A system, method, and computer-readable medium for determining customer adoption based on monitored data, including receiving product usage parameters from a product data store on the computer network, each product usage parameter being determined based on tracking usage of the product by the customer over a predetermined time period, storing a customer profile for the customer comprising customer parameters, the customer parameters being determined based on customer information stored in a customer database on the computer network, receiving service parameters from a customer support data store on the computer network, each service parameter being determined based on tracking support services provided to the customer for the product over the predetermined time period, and generating a product adoption score by applying a machine learning model to the product usage parameters and the customer profile to generate a usage-based adoption score and adjusting the usage-based adoption score based on the service parameters.

16 Claims, 6 Drawing Sheets

(56) References Cited

U.S. PATENT DOCUMENTS

| | | | | |
|---|---|---|---|---|
| 2016/0034919 A1* | 2/2016 | Borah | ................ | G06Q 30/0201 |
| | | | | 705/7.29 |
| 2016/0189082 A1* | 6/2016 | Garrish | ............ | G06Q 10/06393 |
| | | | | 705/7.39 |
| 2019/0042203 A1* | 2/2019 | Cohen | ..................... | H04L 67/22 |
| 2019/0156196 A1* | 5/2019 | Zoldi | .................... | G06F 16/367 |
| 2019/0333078 A1* | 10/2019 | Bala | ................... | G06Q 30/0201 |
| 2020/0356803 A1* | 11/2020 | Yang | ................... | G06F 18/2115 |

\* cited by examiner

METHOD, APPARATUS, AND COMPUTER-READABLE MEDIUM FOR DETERMINING CUSTOMER ADOPTION BASED ON MONITORED DATA

BACKGROUND

Enterprise software providers frequently have hundreds or potentially thousands of different clients utilizing multiple different product offerings. In order to improve customer satisfaction and reduce customer attrition, large enterprises frequently include customer-facing management and services teams, sometimes known as customer success teams.

One problem facing customer success teams under this paradigm is that the remedial actions taken by the customer success team are often reactive, in response to serious difficulties encountered by a customer with a particular product. Customer success teams rely upon input, complaints, or feedback from a customer in order to coordinate their responses. However, many customers will either wait until a product issue reaches a critical stage prior to contacting customer success teams or will otherwise abandon usage of the product in favor of alternatives.

An additional problem with existing customer service and satisfaction systems is that they do not leverage the many diverse sources of customer intelligence that are available in the form of usage data collected on the network. There are many indicators of customer satisfaction that can be derived from usage data that are not readily accessible to customer success teams. For example, the type, nature, and frequency of usage of a particular product may indicate that a customer has increased usage of product, providing an opening to upsell additional services or new products. However, given the massive volume of product-related transactions and activities that occur on enterprise systems and servers every day, it is not feasible for customer-facing teams to monitor such usage in order to make these assessments.

Another source of information pertaining to customer satisfaction are the communications and transactions relating to support services provided to a particular customer. While basic statistics may be available regarding support services provided, there is currently no way to actively monitor this information and integrate this information with other customer-related data in order to provide a complete picture of the customer's usage and satisfaction with a particular product.

Furthermore, customers are frequently idiosyncratic in their behaviors and preferences. A level of support-related/troubleshooting requests that are acceptable to one customer may be unacceptable to another. A long-time customer may have a greater tolerance for bugs than a new customer. While the data exists on enterprise systems to formulate customer preferences, existing systems of customer satisfaction assessment do not leverage this customer-specific information in the context of determining satisfaction with a particular product.

Accordingly, improvements are needed in systems for leveraging product usage and services data on an enterprise network to enhance and customize customer satisfaction monitoring.

DETAILED DESCRIPTION

Figure 1:
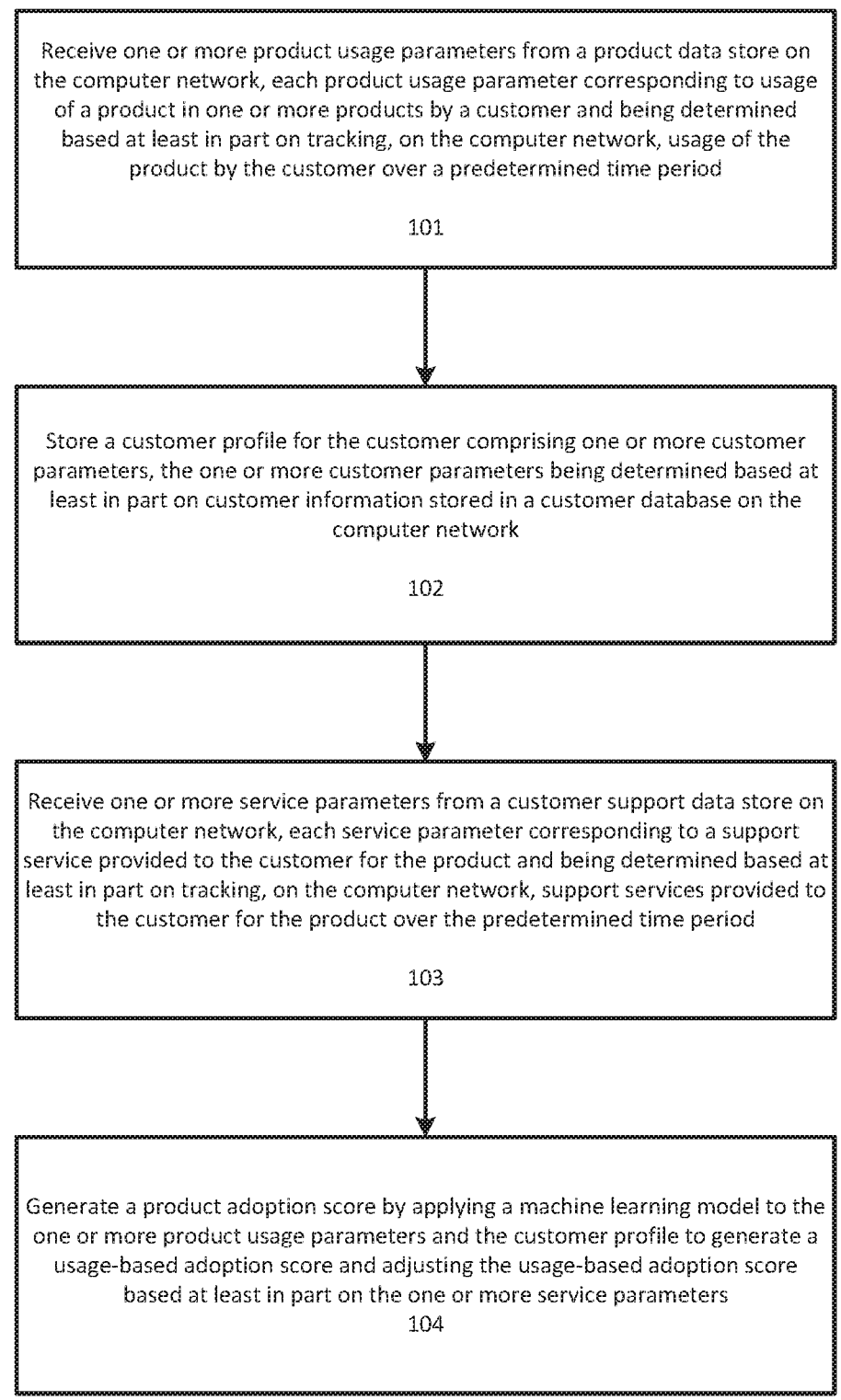
FIG. 1 illustrates a method for determining customer adoption based on monitored data according to an exemplary embodiment.

While methods, apparatuses, and computer-readable media are described herein by way of examples and embodiments, those skilled in the art recognize that methods, apparatuses, and computer-readable media for determining customer adoption based on monitored data are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a novel method, apparatus, and computer-readable medium for determining customer adoption based on monitored data. The disclosed system allows enterprise software vendors to leverage historical data pertaining to product usage, services usage, and customer preferences to generate and apply a machine learning model to monitored data pertaining to a customer's usage of particular enterprise software product on the computer network. The application of the machine learning model allows for the automatic determination of a product adoption level that allows enterprises to track how well a particular customer has adopted a particular product and relative satisfaction of the customer with the product.

Additionally, applicant has discovered a system and method for generating a customer adoption score generated from the product adoption scores corresponding to a customer. The customer adoption score provides enterprises with a single data point for assessing the overall health of the customer and the relationship with the customer. These scores can be leveraged by the enterprises (e.g., by customer success teams) to drive adoption, prevent customer attrition, and preempt technical difficulties.

Enterprise software vendors sell many different types of products and/or services to their customers. It is extremely important for the vendor to know whether a customer has adopted a particular product and whether the customer is extracting business value out of the product. Applicant has identified a number of factors that play a role in understanding product adoption of individual products and overall customer adoption of a product portfolio. These include:

Product Usage—parameters that define the customer's product usage characteristics.

Services Usage—parameters that define the support and other services utilized by the customer for a product.

Customer Profile—a historical profile of the customer that captures the customer's idiosyncrasies and preferences.

Applicant has discovered a novel method and system for generating these parameters based upon product usage and services data extracted from the enterprise network and leveraging these parameters with a machine learning model to generate product and customer adoption scores.

FIG. 1 illustrates a method for determining customer adoption based on monitored data according to an exemplary embodiment.

At step 101 one or more product usage parameters are received from a product data store on the computer network. The product usage parameters can be retrieved from the product data store in response to a request or can automatically be received from the product data store on a periodic basis. As discussed below in greater detail, product usage parameters help to measure the level of adoption of a particular product by a customer.

Each product usage parameter corresponds to usage of a product by a customer and is determined based at least in part on tracking, on the computer network, usage of the product by the customer over a predetermined time period. This tracking can include monitoring product and/or services usage on the computer network by customer computing systems. This tracking can also include querying or retrieving product and/or services usage information from customer computing systems over the enterprise computer network.

For example, the product can be a cloud product that is hosted on the network and provided as a service to the customer. In this case, the customer would have connect to a server every time they wish to access the product. These accesses can be logged and stored and used to generate the product usage parameters. Of course, the product can also be a non-cloud product hosted locally at a customer's device. In this case, usage parameters and the relevant underlying data can be retrieved through communications with the customer's computing system (such as by requesting the relevant data or configuring the local application to transmit periodic updates over the network with the local usage data).

The predetermined time period for tracking usage of the product can be configured by a user or set to some default value, such as an hour, a day, a week, or a month. Additionally, product usage can be tracked on a continuous basis and then partitioned into time-segmented groupings based upon the aggregation time period of the system (which can be user-defined or set to some default value).

Product usage parameters can also be dynamically generated based on information stored in the product data store. For example, the product data store can include a log of all customer logins for a particular customer. This log can then be processed to generate one or more product usage parameters, such as total number of logins within particular time period, the frequency of logins, timing of logins, etc.

It is understood that product usage parameters and the underlying data used to generate the product usage parameters can be stored in any format, such as unstructured documents, relational database tables, etc. Additionally the product usage parameters and the underlying data used to generate the product usage parameters can be categorized or otherwise grouped according to the customer and the relevant product. This can be accomplished, for example, by having corresponding columns for these fields when the data is stored in a table or generating separate tracking files for each customer and product combination.

At step 102 a customer profile for the customer is stored, the customer profile including one or more customer parameters. The one or more customer parameters can be determined based at least in part on customer information stored in a customer database on the computer network.

The customer parameters and/or the customer profile can optionally be dynamically generated on an as-needed basis when computing product adoption or customer adoption. Alternatively, the customer parameters and/or the customer profile can be persistently stored in the customer database or elsewhere in the computer network and accessed when required.

The customer information stored in the customer database on the computer network can be generated and stored based upon communications or customer activity detected by the corresponding data stores or monitoring agents on the data stores and/or other components of computer network. For example, any subscription or product renewals by the customer can be tracked and logged as customer information. This customer information can then be utilized to populate customer parameters and the customer profile.

At step 103 one or more service parameters are received from a customer support data store on the computer network. Similar to the product usage parameters, the service parameters can be retrieved from the customer support data store in response to a request or can automatically be received from the customer support data store on a periodic basis.

Each service parameter corresponds to a support service provided to the customer for the product and is determined based at least in part on tracking, on the computer network, support services provided to the customer for the product over a predetermined time period. This tracking can include monitoring services usage communications between customer computing systems and enterprise systems on the computer network and/or other forms communication between the customer and the enterprise system. For example, troubleshooting phone calls from the customer with respect to a particular product can be logged by some component of the network and used to update the customer support data store. This tracking can also include receiving service related data from a customer computing device over the network. For example, an application executing on the customer computing device can be configured to transmit bug reports when a product crashes.

The predetermined time period for tracking support services can be configured by a user or set to some default value, such as an hour, a day, a week, or a month. Additionally, support services usage can be tracked on a continuous basis and then partitioned into time-segmented groupings based upon the aggregation time period of the system (which can be user-defined or set to some default value).

Service parameters can also be dynamically generated based on information stored in the customer support data store. For example, the customer support data store can include a log of all troubleshooting communications with a customer for a particular product. This log can then be processed to generate one or more service parameters, such as the number of high priority incidents, bugs, negative feedback, etc.

It is understood that service parameters and the underlying data used to generate the service parameters can be stored in any format, such as unstructured documents, relational database tables, etc. Additionally the service parameters and the underlying data used to generate the service parameters can be categorized or otherwise grouped according to the customer and the relevant product. This can be accomplished, for example, by having corresponding columns for these fields when the data is stored in a table or generating separate tracking files for each customer and product combination.

At step 104 a product adoption score is generated by applying a machine learning model to the one or more product usage parameters and the customer profile to generate a usage-based adoption score and adjusting the usage-based adoption score based at least in part on the one or more service parameters. This step is described in greater detail with respect to FIG. 4, discussed below.

Figure 2:
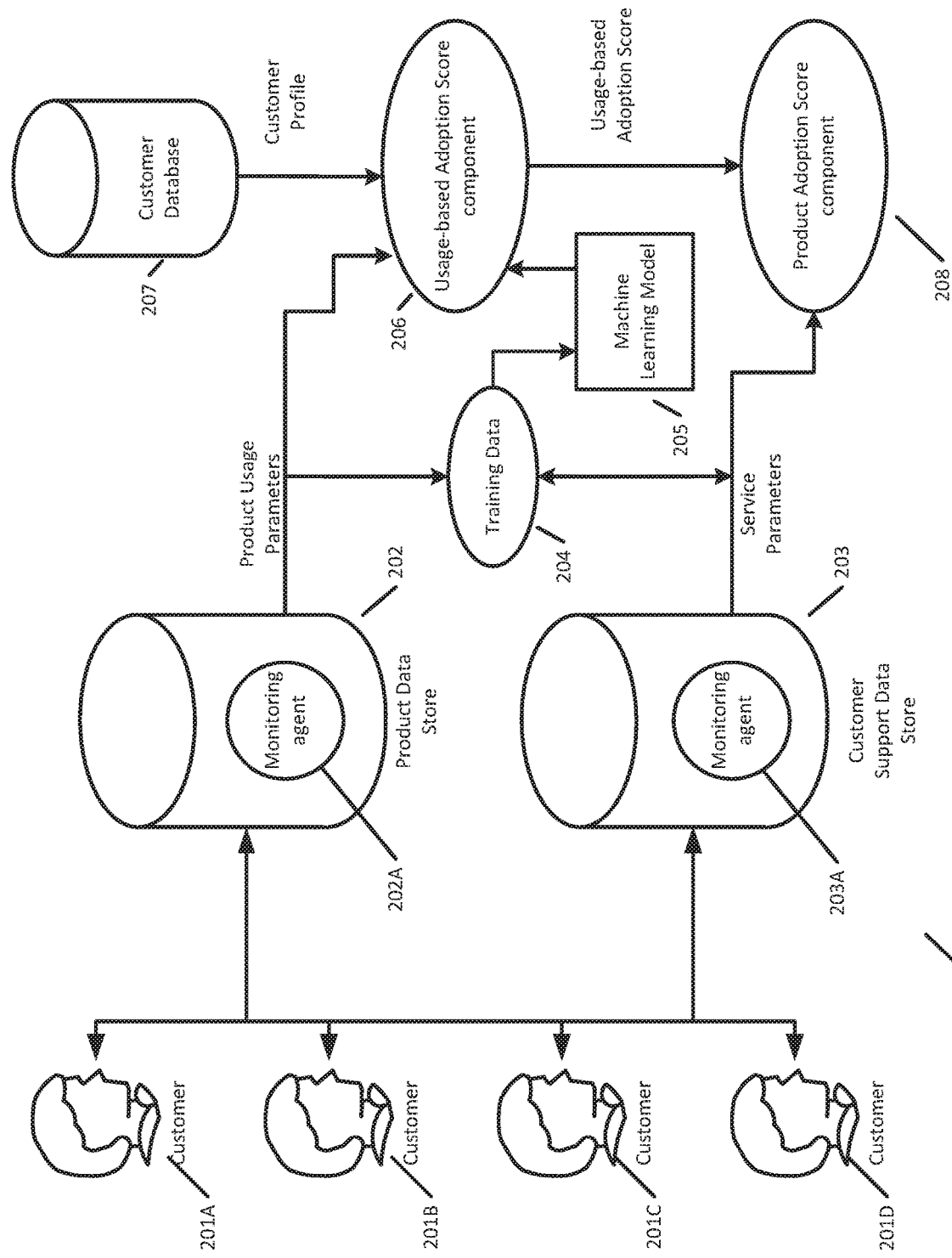
FIG. 2 illustrates a network diagram for a system for determining customer adoption based on monitored data according to an exemplary embodiment.

FIG. 2 illustrates a network diagram for a system for determining customer adoption based on monitored data according to an exemplary embodiment.

As shown in FIG. 2, the enterprise network 200 includes customers 201A-201D that communicate with various data stores of the enterprise network 200. It is understood that an enterprise would have a far greater number of data stores arranged in multiple different variations, but these data stores are omitted from the figure for clarity.

Enterprise network 200 includes a product data store 202 that stores and/or tracks product usage information. As shown in FIG. 2, the product data store 202 includes a monitoring agent 202A configured to monitor communications on the network and update the product data store accordingly. In the situation where the product usage data is distributed over multiple different product data stores, each product data store can have a monitoring agent or a separate monitoring agent can be responsible for placing the appropriate data in each product data store. Monitoring communications on the network can include monitoring usage information tracked by data stores on the network, monitoring messages between the enterprise network 200 and customers 201A-201D, and/or querying other data stores to update product usage information on the product data store. For example, the monitoring agent 202A of the product data store 202 can query a product database for a particular product to retrieve information pertaining to a customer's usage of that product.

Enterprise network additionally includes a customer support data store 203 that stores and/or tracks customer support services provided to the customer for various products. Customer support data store 203 can also include a monitoring agent configured to monitor communications and/or usage on the network and update the customer support data store 203 when any new support service information is logged. The customer support data store can also be distributed across multiple data stores, each having their own monitoring agent. Alternatively, a single monitoring agent can be responsible for placing the appropriate information in each customer support data store. Monitoring communications on the network can include monitoring messages sent to components of the network, such as services data store, monitoring messages between the enterprise network 200 and customers 201A-201D, and/or querying other data stores to update support service information on the customer support data store 203. For example, the monitoring agent 203A of the customer support data store 203 can query an employee feedback database to retrieve feedback or ratings provided by a customer in response to a troubleshooting phone call with the employee with respect to a particular product.

As shown in FIG. 2, product usage parameters from the product data store 202 and service parameters from the customer support data store can be packaged as part of training data 204 that is provided to a machine learning model 205.

The present system utilizes an active feedback loop to continually update and improve the machine learning model 205. In particular, the product adoption scores and customer adoption scores generated by the system can be cross-referenced with the underlying product usage parameters and service parameters and feedback from employees (such as members of the customer success team) to continually refine the machine learning model and provide more accurate scores. For example, members of the customer success team can independent provide subjective evaluations of product adoption and customer adoption to the system, in the form of surveys or rankings, and these subjective evaluations can be used to modify or improve how the machine learning model performs feature extraction, feature aggregation, weights, or some other function that determines the ultimate product adoption score or customer adoption score.

The training data 204 can also include data provided by or retrieved from other data stores on the network and/or data provided by a user or employee. For example, the training data can include account histories and historical records pertaining to past customers, such as customer feedback (positive or negative), customer cancellations, customer purchases or upgrades, historical product usage data and parameters, historical customer support data and services parameters, etc. The training data 204 can also include information provided by employees, such as customer success teams, such as subjective evaluations for how well a particular product has been adopted by customers, past or present, or how well customers have adopted the company's products overall. Additionally, training data 204 can include information provided directly by customers, such as results of surveys, feedback ratings, etc.

The machine learning model 205 can be a supervised machine learning model, such as a logistic regression based model or a random forest model. Supervised machine learning assumes a-priori knowledge of the universe of discourse and is based on expert information as a foundation of the learning process. In this case, the expert information used during training of model can be information provided by customer success teams or customers. The machine learning model can also be trained by applying the machine learning model to a training data set including previous product usage parameters, previous customer profiles, previous service parameters, and previous product adoption scores Enterprise network 200 also includes a customer database 207 that stores a customer information used to generate customer profiles and/or the customer profile themselves. The customer database can optionally also include or a monitoring agent configured to monitoring network communications on the enterprise network 200 and update the stored customer information and/or customer profile.

Enterprise network 200 includes a usage-based adoption score component 206 that is configured to generate the usage-based adoption score for a particular customer and product. The usage-based adoption score component 206 can be located anywhere on the enterprise network 200, such as on a backend server, and receives product usage parameters from the product data store 202 and customer profiles from the customer database 207. Alternatively, the usage-based adoption score component 206 can receive product usage data from the product data store 202 and generate the product usage parameters internally and/or receive customer information from the customer database 207 and generate the customer profile internally.

Additionally, the machine learning model 205 interfaces with usage-based adoption score component 206 for the purpose of determining the usage-based adoption score. This interface can be implemented by, for example, a function call from the usage-based adoption score component 206 to the machine learning model 205. The machine learning model 205 can optionally be integrated into the usage-based adoption score component 206.

As shown in FIG. 2, the usage-based adoption score is sent from the usage-based adoption score component 206 to the product adoption score component 208. The product adoption score component 208 also receives the service parameters from the customer support data store 203. Alternatively, the adoption score component 208 can receive customer support data from the customer support data store 203 and generate the service parameters internally.

As discussed further below, the product adoption score component 208 can also receive training data 204 and utilize the training data or a portion thereof to determining weights used in calculating the product adoption score.

The product adoption score component 208 is configured to determine the final product adoption score that quantifies how well a particular customer has adopted a particular product. Additionally, the product adoption score component 208 can also communicate with an alerting, reporting, or notifications component (not shown) that compiles one or more product adoption scores and generates reports or other output for delivery to employees of the enterprise (such as a customer success team).

Figure 3:
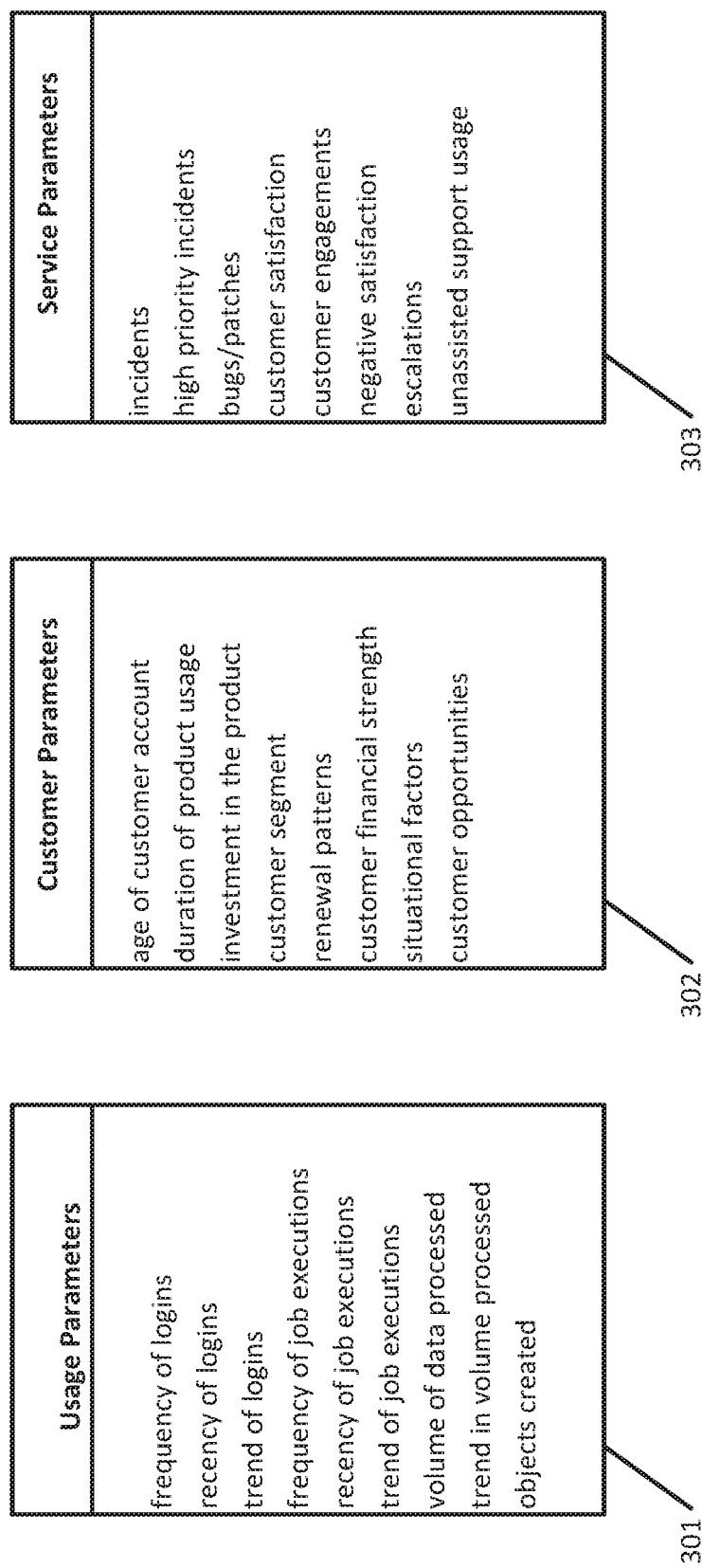
FIG. 3 illustrates the various usage, customer, and service parameters that can be used for generating the product adoption score according to an exemplary embodiment.

FIG. 3 illustrates the various usage, customer, and service parameters that can be used for generating the product adoption score according to an exemplary embodiment.

Usage parameters 301 are based upon the product usage data and are used to generate the usage-based adoption score and the product adoption score. Usage parameters 301 can include, for example, a frequency of logins, a recency of logins, a trend of logins over a period of time, a frequency of job executions, a recency of job executions, a trend of job executions over a period of time, a volume of data processed, or a trend in volume of data processed over a period of time.

Volume of data processed can be measured in various ways. For example, the volume of data processed can be measured as a number of rows created, modified, or otherwise processed, a number of data objects created, modified, or otherwise processed.

Trends can include trends in the above-described parameters over a predetermined time period and can be measured in various ways. For example, the trends can be quantified as the slope of the corresponding trend at a particular point in time.

Customer parameters 302 are based upon customer information in the customer database and are used to generate the customer profile. Customer parameters 302 can include, for example, an age of an account associated with the customer, a duration of usage of the product by the customer, a level of investment in the product by the customer, a segment of the customer, customer renewal patterns, customer financial strength, and/or situational factors. Situational factors can include factors specific to the customer's current situation, such as mergers and acquisitions relating to the customer, revenue growth, re-organization, changes in contacts or personnel, customer attrition, etc. Customer parameters 302 can also include projected customer opportunities, such as upcoming sales opportunities based upon past sales and/or transaction trends.

Service parameters 303 are based upon customer support/services data in the customer support data store and are used to generate a services index that itself is used to determine the product adoption score. Service parameters 303 can include incidents, high priority incidents, bugs/patches, customer satisfaction metrics, customer engagements, negative satisfaction records, escalations, and/or unassisted support usage.

Service parameters 303 can also include metrics derived from these parameters, such as a count or quantity, a percentage, etc. For example, escalation metrics can include, for example, a percentage of cases or incidents escalated over a predetermined time period. High-priority incidents can be measured as, for example a percentage of all incidents were classified as high-priority incidents in a predetermined time period. Customer satisfaction and negative satisfaction parameters can include, for example, a percentage of cases over a predetermined time period in which customer satisfaction (as measured by a survey) was below a certain score or rating (e.g., satisfaction less than 4 on a 10 point scale). Bug/patch metrics can include a percentage of cases with bugs within a predetermined time period. Customer engagements can include, for example, a quantity of customer engagements (such as trainings, tutorials, meetings) over a period of time.

Unassisted support usage parameters can measure customer engagement with self-help tutorials or portals for a particular product. Examples of unassisted support usage parameters include portal usage, recency, frequency, search terms, forum posts or searches, etc.

All of the parameters shown in FIG. 3, including the usage parameters 301, customer parameters 302, and service parameters 303 can be weighted according to different weight schemes. For example, a parameter can be time-weighted to assign higher weights to more recent events. In this example, a recent bug occurring in the past week would receive a higher weight than a bug occurring 3 months prior.

Figure 4:
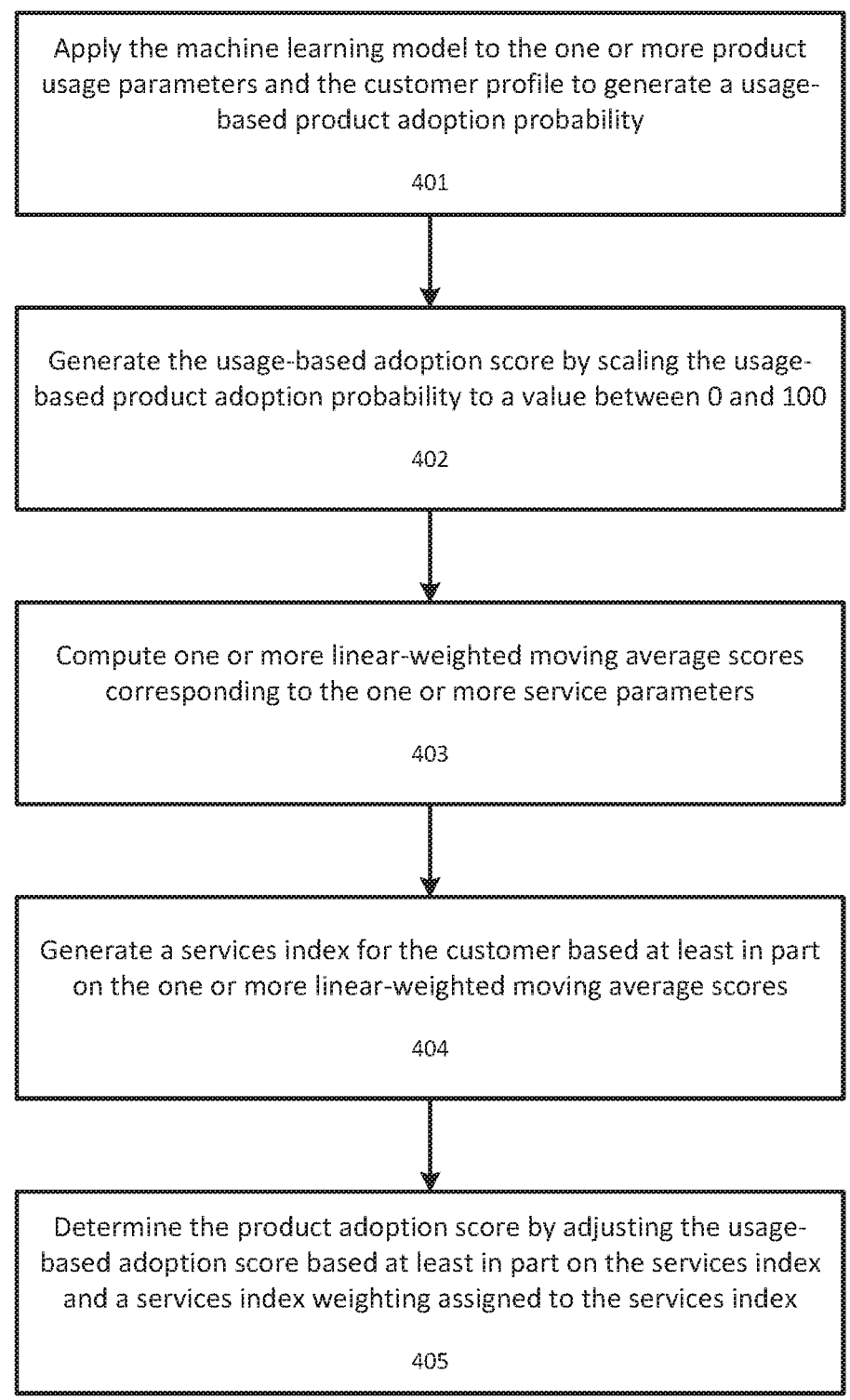
FIG. 4 illustrates a flowchart for generating a product adoption score by applying the machine learning model to the one or more product usage parameters and the customer profile to generate a usage-based adoption score and adjusting the usage-based adoption score, according to an exemplary embodiment.

FIG. 4 illustrates a flowchart for generating a product adoption score by applying the machine learning model to the one or more product usage parameters and the customer profile to generate a usage-based adoption score and adjusting the usage-based adoption score, according to an exemplary embodiment.

At step 401 the machine learning model is applied to the one or more product usage parameters and the customer profile to generate a usage-based product adoption probability. This step determines the probability, $P(Adopted|x)$, of a customer adopting the product, where x is the observed product usage parameters and the customer profile. The product usage parameters and the customer profile are provided as input to the machine learning model, which performs the steps of feature extraction and feature aggregation to identify data points within the training data that most closely match the product usage parameters and the customer profile. The probability associated with these data points is then output by the machine learning model as the usage-based product adoption probability.

As discussed earlier, this probability can be generated using any supervised machine learning algorithm, such as logistic regression or random forest. These models are trained using historical data that identifies whether a customer has adopted a product. This training data can be obtained from account managers, customer success managers, or other employees or data stores that maintain this data about customers.

At step 402 the usage-based adoption score is generated by scaling the usage-based product adoption probability to a value between 0 and 100. As the probability value is an integer between 0 and 1, inclusive, the usage-based adoption score is determined by multiplying this probability value by 100:

Usage-Based Adoption Score=$P(\text{Adopted}|x)*100$.

At the end of this step the usage-based adoption score will therefore be a value between 0 and 100.

At step 403 one or more linear-weighted moving average scores are computed corresponding to the one or more service parameters.

Negative sentiment events such as escalation or bugs that have occurred recently for a customer are more impactful than events that have occurred long in the past. The linear-weighted moving average scores are a weighted average of recency and frequency that adjusts for these variations.

The Linear Weighted Moving Average (LWMA) score for each services [arameter for a customer can be calculated as:

$$CustomerProductServiceParameter_{LWMA} = \frac{\sum_{i=0}^{N-1} ServiceParameter_{N-i} * (N-i)}{N}$$

CustomerProductServiceParameter$_{LWMA}$ is the Linear Weighted Moving Average for a particular service parameter and a particular product.

Linear Weighted Moving Average is used so that most recent event has the highest weight, and each prior event has progressively less weight. The weights drop in a linear fashion as recency of the event increases ServiceParameter$_{N-i}$ is the proportion of cases affected by the service parameter for the selected time period. For example:

Proportion of Cases escalated in the Current Month (Previous month etc.)
Proportion of high priority cases in the Current Month (Previous month etc.)
Proportion of bug cases in the Current Month (Previous month etc.)

N is the selected/predetermined time period for events are measures. For example if N=6 months, then customer service events that have occurred to the customer in the past 6 months are used to generate the CustomerProductServiceParameter$_{LWMA}$ for each service parameter.

At step 404 a services index is generated for the customer based at least in part on the one or more linear-weighted moving average scores.

Service parameters, such as bugs and escalation patterns, will vary across different parameters. For example, a stable product will not have as many bugs or escalations as an emerging product. The services index accounts for these variations by taking into account maximum and minimum CustomerProductServiceParameter$_{LWMA}$ scores.

After the LWMA scores are determined for each service parameter in step 403, the services index for a customer is generated in step 404 by normalizing and computing the average of the LWMA scores. The Services Index (SI) is the average of the scores computed for different service parameters and can be computed as:

$$SI = \frac{\sum_{i=1}^{NumServiceParameters} \frac{(\text{Max}(x_i) - x_i)}{(\text{Max}(x_i) - \text{Min}(x_i))} * (100)}{NumServiceParameters}$$

$x_i$ is the CustomerProductServiceParameter$_{LWMA}$ for the customer for a given service parameter (as determined in step 403).

Max($x_i$) is the maximum ProductServiceParameter$_{LWMA}$ for the specific product and the customer.

Min($x_i$) is the minimum ProductServiceParameter$_{LWMA}$ for the specific product and the customer.

NumServiceParameters is the total number of service parameters for which the services index is computed.

The numerator of the above equation is normalized to a score of 0 to 100 using a Min-Max scaling formula resulting in a Services Index (SI) with a value between 0 and 100, inclusive.

At step 405 the product adoption score is determined by adjusting the usage-based adoption score based at least in part on the services index and a services index weight assigned to the services index. While product usage is a key element that captures the level of adoption of a product, the services index is also an important factor that measures ongoing sentiment of a customer and how well the product is being adopted. Therefore, product usage-based scores (such as the usage-based adoption score generated in step 402) are used to generate an initial value that is then adjusted based upon the services index generated in step 404.

The product adoption score can be computed as:

PH(Product Adoption Score)=MAX(0,Usage_Based Adoption Score−ω*(100−SI)).

Usage_Based Adoption Score is the usage-based adoption score generated in step 402.

SI ($0 \leq SI \leq 100$, 100 being the best) is the Services Index generated in step 404. As discussed above, this is a weighted combination of support/services related parameters such as escalations, satisfaction, bugs, etc.

ω is the weight that is given to the services index. This weight can be adjusted depending on the amount of product usage information available for a particular product such that the services index is given a greater weight when there is minimal product usage information and lesser weight when there is sufficient product usage information.

Note that the maximum function is used with zero as a lower bound since the product adoption score cannot be negative.

For example, cloud products will have sufficient product usage information, due to all interactions being tracked on the enterprise network. Therefore, a lower weight co can be utilized for cloud products.

Alternatively, the weight can be increased when the product usage information falls below a predetermined threshold. For example, on premises products can have less available product usage information, since many of the customer's interactions are performed on the customer's system and may not be reported to the enterprise network. In this case, the weight co assigned to the services index can be increased to compensate for this lack of product usage data.

The weight ω can be determined by an administrator or other employee (such as a customer success team member). Alternatively, the weight co can be automatically determined based upon the type of product or the quantity of available of product usage information. For example, if the total number of product usage records falls below a certain threshold, a corresponding weight ω can be attributed to the services index.

The weight ω can also be determined based at least in part on a training data set used to train the machine learning model, including previous product usage parameters, a previous customer profiles, previous service parameters, and previous product adoption scores.

For example, the weight ω can be determined from a sample of training data with the equation for product adoption score, given rest of the parameters:

$$PH(\text{Product Adoption Score}) = MAX(0, \text{Usage\_Based Adoption Score} - \omega*(100-SI)).$$

From the above equation, given the rest of the parameters (extracted from the training data) and the actual product adoption score (extracted from the training data and/or provided by employees such as the customer success team), w can be solved for and averaged across the training data set as:

$$\omega = (F(\text{ProductUsage}, \text{CustomerProfile})*100 - (100-SI))/(PH+1)$$

ω is higher for products with less product usage and lower for products with more product usage based on our experimental testing and calculations performed on training data sets.

For certain products, such as cloud products, all the product usage information for a customer is readily available. In this case, usage-based product adoption score plays a major role in determining the product adoption score and the services index weights will be comparatively lower than for non-cloud products. Again, for on-premises products, depending on the quantity of data available from services usage, a higher weight values are utilized.

In an exemplary embodiment, a weight ω of 0.3 is utilized for cloud products and a weight of 0.5 is utilized for on-premises products. These values have been experimentally determined to provide the best results in terms of accuracy of the product adoption score when evaluated or verified by human judges (such as customer success team members).

The services index, services index weight, and the usage-based product adoption score can all contribute to the ultimate product adoption score for a customer, but in some situations the services-based metrics will not have an impact. For example, if a customer has a usage-based product adoption score of 90 for a particular product and a services index value of 100, then the overall product adoption score would be:

$$MAX(0, 90 - \omega*(100-100)) = MAX(0, 90) = 90.$$

Alternatively, if the services index for the same customer and product was very low, then the overall product adoption score will be adjusted downwards from the usage-based product adoption score, depending on the weight co. The overall product adoption score will always fall within the range 0-100.

In many cases, a customer may be a customer of multiple products offered by the enterprise software vendor. The enterprise software vendor may then wish to know how well the customer has adopted multiple products in the vendor's portfolio. This can be computed in the form of a customer adoption score that is determined based at least in part on a plurality of product adoption scores corresponding to the plurality of products and a plurality of product weights corresponding to the plurality of products. This customer adoption score corresponds to the overall adoption of the plurality of products by the customer.

Figure 5:
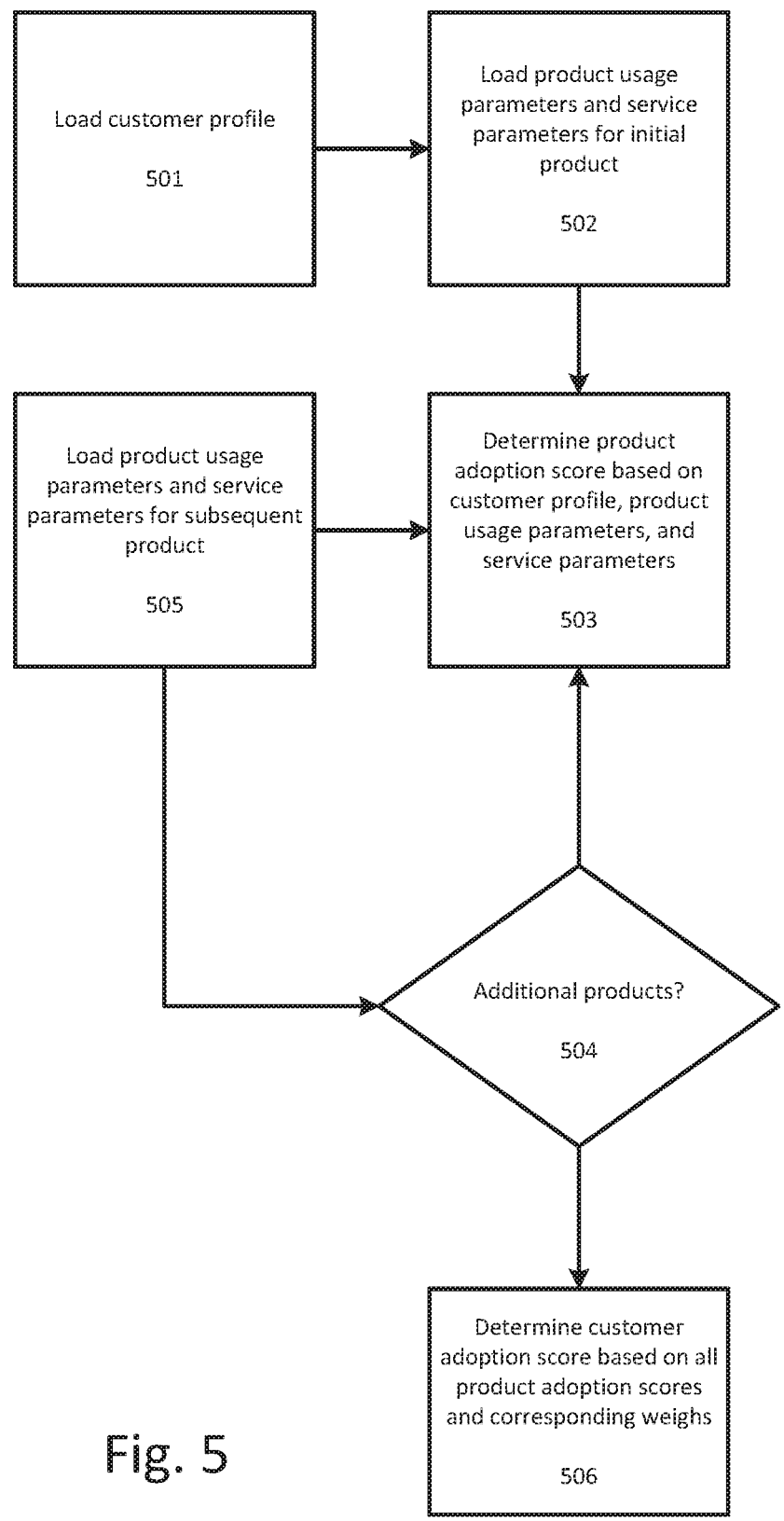
FIG. 5 illustrates a flowchart for generating a customer adoption score for a customer based at least in part on a plurality of product adoption scores corresponding to the plurality of products and a plurality of product weights corresponding to the plurality of products according to an exemplary embodiment.

FIG. 5 illustrates a flowchart for generating a customer adoption score for a customer based at least in part on a plurality of product adoption scores corresponding to the plurality of products and a plurality of product weights corresponding to the plurality of products according to an exemplary embodiment.

At step 501 the customer profile is loaded and/or generated. For example the customer profile can be retrieved from a customer database or generated based on customer data extracted from a customer database.

At step 502 product usage parameters and service parameters are loaded for an initial product in the customer's portfolio. These parameters can be retrieved from, or generated based upon data retrieved from, a product data store and customer support data store, as discussed earlier.

At step 503 a product adoption score is determined for the product based on the customer profile, the product usage parameters, and the service parameters. This step corresponds to the steps 101-104 shown in FIG. 1.

At step 504 an assessment is made regarding whether there are any additional products in the customer's portfolio. This assessment can be based upon, for example, a query of the customer database or multiple product databases to identify all products corresponding to particular customer.

If there are additional products, then at step 505 the product usage parameters and service parameters are loaded for a subsequent product used by the customer. Step 503 is then repeated for the subsequent product usage and service parameters and the process again proceeds to step 504.

If there are no additional products associated with a customer, then at step 506 a customer adoption score is determined based on all product adoption scores and corresponding weights for each of the products.

The customer adoption score can be computed as a weighted sum of the individual product adoption scores:

$$\text{Customer Adoption Score} = \sum_{i=1}^{\#Products} PW_i * PH_i$$

$PH_i$ is the product score for the i-th product of the customer, computed using the steps shown in FIG. 1.

$PW_i$ is the weight assigned to the i-th product of the customer and is a value between 0-1. These weights can be determined based on a number of factors, including:

Customer age on the product—how long a customer has been using a particular product.

Customer level of investment on the product. For example a customer who is a top 10% investor on a particular product may have more weight assigned to that product.

Type of sale—subscription products can be given a higher weight than perpetual license products, due to recurring revenues and importance to the enterprise's business.

The weights $PW_i$ can be customized according to different business models of the enterprise software vendor. If an enterprise is more focused on emerging products and subscription products, then those products can be given higher weights.

The weights $PW_i$ can be useful when the same customer has multiple products based on different business models and at different maturity levels. In this scenario, the customer adoption score can be influenced more by the product adoption scores of subscription products rather than products that are recently purchased under a perpetual license.

Similarly if a Customer has invested in two products in varying amounts, then the products with higher investment amounts or percentages (based on either the customer's total spending or the fraction of the total product revenue for the different products) can be attributed a higher weight.

The customer adoption score is a value (between 0-100) that quantifies the overall "health" of the customer account from the perspective of the enterprise software vendor and that does so by applying machine learning models to monitored network data. This allows for accurate and up-to-date determination of how well a customer is adopting and using the vendor's products.

The customer adoption score, once generated, can optionally be packaged in a report or presented in the graphical user interface for delivery to employees of the enterprise, such as customer success teams. Optionally, the customer adoption score (or individual product adoption scores) can be linked to alerting tools and functionalities so that, for example, an alert is transmitted if the customer adoption score (or an individual product adoption score) drops below a predefined threshold.

Figure 6:
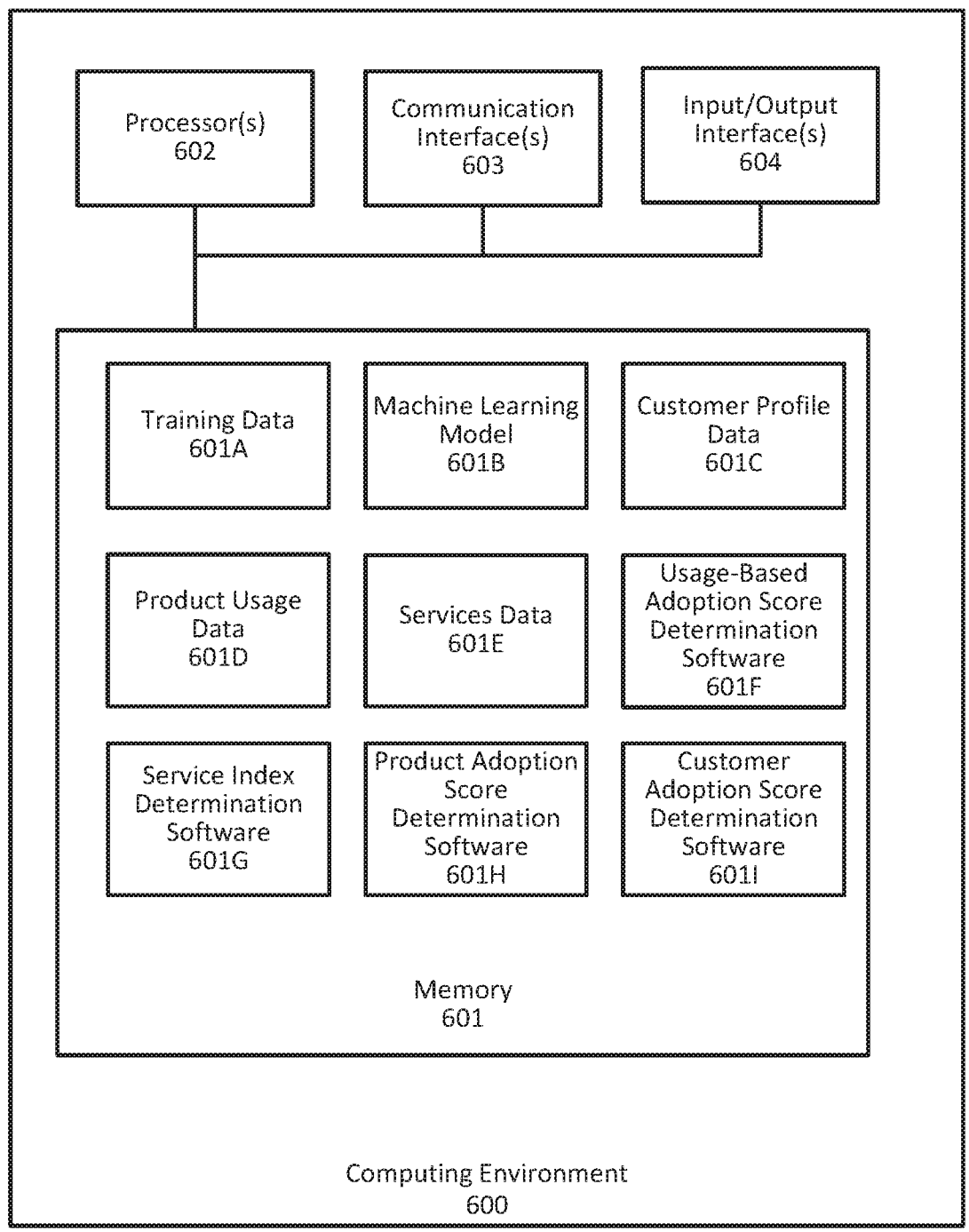
FIG. 6 illustrates a specialized computing environment for determining customer adoption based on monitored data according to an exemplary embodiment.

FIG. 6 illustrates a specialized computing environment for determining customer adoption based on monitored data according to an exemplary embodiment. Computing environment 600 includes a memory 601 that is a non-transitory computer-readable medium and can be volatile memory (e.g., registers, cache, RAM), non-volatile memory (e.g., ROM, EEPROM, flash memory, etc.), or some combination of the two.

As shown in FIG. 6, memory 601 stores training data 601A, machine learning model 601B, customer profile data 601C, product usage data 601D, services data 601E, usage-based adoption score determination software 601F, service index determination software 601G, product adoption score determination software 601H, and customer adoption score determination software 601I. Each of the software components in memory 601 store specialized instructions and data structures configured to perform the network monitoring, product adoption determination, and customer adoption determination techniques described herein.

All of the software stored within memory 601 can be stored as a computer-readable instructions, that when executed by one or more processors 602, cause the processors to perform the functionality described with respect to FIGS. 1-5.

Processor(s) 602 execute computer-executable instructions and can be a real or virtual processors. In a multi-processing system, multiple processors or multicore processors can be used to execute computer-executable instructions to increase processing power and/or to execute certain software in parallel.

The computing environment additionally includes a communication interface 603, such as a network interface, which is used to communicate with devices, applications, or processes on a computer network or computing system, collect data from devices on the network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Computing environment 600 further includes input and output interfaces 604 that allow users (such as system administrators) to provide input to the system and display or otherwise transmit information for display to users. For example, the input/output interface 604 can be used to configure time periods for adoption score calculations and tabulation and provide feedback from customer success teams for use as training data 601A in the machine learning model 601B.

An interconnection mechanism (shown as a solid line in FIG. 6), such as a bus, controller, or network interconnects the components of the computing environment 600.

Input and output interfaces 604 can be coupled to input and output devices. The input device(s) can be a touch input device such as a keyboard, mouse, pen, trackball, touch screen, or game controller, a voice input device, a scanning device, a digital camera, remote control, or another device that provides input to the computing environment. The output device(s) can be a display, television, monitor, printer, speaker, or another device that provides output from the computing environment 600. Displays can include a graphical user interface (GUI) that presents options to users such as system administrators for configuring encryption and decryption processes.

The computing environment 600 can additionally utilize a removable or non-removable storage, such as magnetic disks, magnetic tapes or cassettes, CD-ROMs, CD-RWs, DVDs, USB drives, or any other medium which can be used to store information and which can be accessed within the computing environment 600.

The computing environment 600 can be a set-top box, personal computer, a client device, a database or databases, or one or more servers, for example a farm of networked servers, a clustered server environment, or a cloud network of computing devices and/or distributed databases.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by one or more computing devices on a computer network for determining customer adoption based on monitored data, the method comprising:

receiving, by at least one of the one or more computing devices, one or more product usage parameters from a product data store on the computer network, each product usage parameter corresponding to usage of a product in one or more products by a customer and being determined based at least in part on tracking, by one or more first monitoring agents executing on the computer network and communicatively coupled to the product data store, usage of the product by the customer over a predetermined time period;

storing, by at least one of the one or more computing devices, a customer profile for the customer comprising one or more customer parameters, the one or more customer parameters being determined based at least in part on customer information stored in a customer database on the computer network;

receiving, by at least one of the one or more computing devices, one or more service parameters from a customer support data store on the computer network, each service parameter corresponding to a support service provided to the customer for the product and being determined based at least in part on tracking, by one or more second monitoring agents executing on the computer network and communicatively coupled to the customer support data store, support services provided to the customer for the product over the predetermined time period;

generating, by at least one of the one or more computing devices, a usage-based adoption score by applying a machine learning model to the one or more product usage parameters and the customer profile, wherein the machine learning model is trained by applying the machine learning model to a training data set comprising a plurality of previous product usage parameters, a plurality of previous customer profiles, a plurality of previous service parameters, and a plurality of previous product adoption scores;

generating, by at least one of the one or more computing devices, a services index corresponding to the one or more service parameters based at least in part on one or more linear-weighted moving average scores corresponding to the one or more service parameters, the one or more linear weighted moving average scores comprising a weighted average of recency and frequency of the one or more service parameters;

generating, by at least one of the one or more computing devices, a product adoption score by adjusting the usage-based adoption score based at least in part on the services index and a services index weighting assigned to the services index.

2. The method of claim 1, wherein the product comprises a cloud product that is hosted on the computer network.

3. The method of claim 1, wherein the one or more product usage parameters comprise one or more of: a frequency of logins, a recency of logins, a trend of logins over a period of time, a frequency of job executions, a recency of job executions, a trend of job executions over a period of time, a volume of data processed, or a trend in volume of data processed over a period of time.

4. The method of claim 1, wherein the one or more customer parameters comprise one or more of: an age of an account associated with the customer, a duration of usage of the product by the customer, a level of investment in the product by the customer, a segment of the customer, customer renewal patterns, customer financial strength, or a situational factor.

5. The method of claim 1, wherein the one or more service parameters comprise one or more of: a quantity of incidents reported; a quantity of bugs reported, a quantity of negative customer satisfaction records, or a quantity of escalations reported.

6. The method of claim 1, wherein generating a usage-based adoption score by applying a machine learning model to the one or more product usage parameters and the customer profile comprises:

applying the machine learning model to the one or more product usage parameters and the customer profile to generate a usage-based product adoption probability; and generating the usage-based adoption score by scaling the usage-based product adoption probability to a value between 0 and 100.

7. The method of claim 1, wherein the services index weighting is determined based at least in part on a training data set comprising a plurality of previous product usage parameters, a plurality of previous customer profiles, a plurality of previous service parameters, and a plurality of previous product adoption scores.

8. The method of claim 1, wherein the one or more products comprise a plurality of products and further comprising:

generating, by at least one of the one or more computing devices, a customer adoption score for the customer based at least in part on a plurality of product adoption scores corresponding to the plurality of products and a plurality of product weights corresponding to the plurality of products, wherein the customer adoption score corresponds to overall adoption of the plurality of products by the customer.

9. An apparatus on a computer network for determining customer adoption based on monitored data, the apparatus comprising:

one or more processors; and one or more memories operatively coupled to at least one of the one or more processors and having instructions stored thereon that, when executed by at least one of the one or more processors, cause at least one of the one or more processors to:

receive one or more product usage parameters from a product data store on the computer network, each product usage parameter corresponding to usage of a product in one or more products by a customer and being determined based at least in part on tracking, by one or more first monitoring agents executing on the computer network and communicatively coupled to the product data store, usage of the product by the customer over a predetermined time period;

store a customer profile for the customer comprising one or more customer parameters, the one or more customer parameters being determined based at least in part on customer information stored in a customer database on the computer network;

receive one or more service parameters from a customer support data store on the computer network, each service parameter corresponding to a support service provided to the customer for the product and being determined based at least in part on tracking, by one or more second monitoring agents executing on the computer network and communicatively coupled to the customer support data store, support services provided to the customer for the product over the predetermined time period;

generate a usage-based adoption score by applying a machine learning model to the one or more product usage parameters and the customer profile, wherein the machine learning model is trained by applying the machine learning model to a training data set comprising a plurality of previous product usage parameters, a plurality of previous customer profiles, a plurality of previous service parameters, and a plurality of previous product adoption scores;

generate a services index corresponding to the one or more service parameters based at least in part on one or more linear-weighted moving average scores corresponding to the one or more service parameters, the one or more linear weighted moving average scores comprising a weighted average of recency and frequency of the one or more service parameters; and generate a product adoption score by adjusting the usage-based adoption score based at least in part on the services index and a services index weighting assigned to the services index.

10. The apparatus of claim 9, wherein the instructions that, when executed by at least one of the one or more processors, cause at least one of the one or more processors to generate a usage-based adoption score by applying a machine learning model to the one or more product usage parameters and the customer profile further cause at least one of the one or more processors to:
apply the machine learning model to the one or more product usage parameters and the customer profile to generate a usage-based product adoption probability; and
generate the usage-based adoption score by scaling the usage-based product adoption probability to a value between 0 and 100.

11. The apparatus of claim 9, wherein the one or more products comprise a plurality of products and wherein at least one of the one or more memories has further instructions stored thereon that, when executed by at least one of the one or more processors, cause at least one of the one or more processors to:
generate a customer adoption score for the customer based at least in part on a plurality of product adoption scores corresponding to the plurality of products and a plurality of product weights corresponding to the plurality of products, wherein the customer adoption score corresponds to overall adoption of the plurality of products by the customer.

12. At least one non-transitory computer-readable medium storing computer-readable instructions that, when executed by one or more computing devices, cause at least one of the one or more computing devices to:
receive one or more product usage parameters from a product data store on the computer network, each product usage parameter corresponding to usage of a product in one or more products by a customer and being determined based at least in part on tracking, by one or more first monitoring agents executing on the computer network and communicatively coupled to the product data store, usage of the product by the customer over a predetermined time period;
store a customer profile for the customer comprising one or more customer parameters, the one or more customer parameters being determined based at least in part on customer information stored in a customer database on the computer network;
receive one or more service parameters from a customer support data store on the computer network, each service parameter corresponding to a support service provided to the customer for the product and being determined based at least in part on tracking, by one or more second monitoring agents executing on the computer network and communicatively coupled to the customer support data store, support services provided to the customer for the product over the predetermined time period;
generate a usage-based adoption score by applying a machine learning model to the one or more product usage parameters and the customer profile, wherein the machine learning model is trained by applying the machine learning model to a training data set comprising a plurality of previous product usage parameters, a plurality of previous customer profiles, a plurality of previous service parameters, and a plurality of previous product adoption scores;
generate a services index corresponding to the one or more service parameters based at least in part on one or more linear-weighted moving average scores corresponding to the one or more service parameters, the one or more linear weighted moving average scores comprising a weighted average of recency and frequency of the one or more service parameters; and
generate a product adoption score by adjusting the usage-based adoption score based at least in part on the services index and a services index weighting assigned to the services index.

13. The at least one non-transitory computer-readable medium of claim 12, wherein the instructions that, when executed by at least one of the one or more computing devices, cause at least one of the one or more computing devices to generate a usage-based adoption score by applying a machine learning model to the one or more product usage parameters and the customer profile further cause at least one of the one or more computing devices to:
apply the machine learning model to the one or more product usage parameters and the customer profile to generate a usage-based product adoption probability; and
generate the usage-based adoption score by scaling the usage-based product adoption probability to a value between 0 and 100.

14. The at least one non-transitory computer-readable medium of claim 12, wherein the one or more products comprise a plurality of products and further storing computer-readable instructions that, when executed by at least one of the one or more computing devices, cause at least one of the one or more computing devices to:
generate a customer adoption score for the customer based at least in part on a plurality of product adoption scores corresponding to the plurality of products and a plurality of product weights corresponding to the plurality of products, wherein the customer adoption score corresponds to overall adoption of the plurality of products by the customer.

15. The apparatus of claim 9,
wherein the one or more product usage parameters comprise one or more of: a frequency of logins, a recency of logins, a trend of logins over a period of time, a frequency of job executions, a recency of job executions, a trend of job executions over a period of time, a volume of data processed, or a trend in volume of data processed over a period of time; and
wherein the one or more customer parameters comprise one or more of: an age of an account associated with the customer, a duration of usage of the product by the customer, a level of investment in the product by the customer, a segment of the customer, customer renewal patterns, customer financial strength, or a situational factor.

16. The at least one non-transitory computer-readable medium of claim 12,
wherein the one or more product usage parameters comprise one or more of: a frequency of logins, a recency of logins, a trend of logins over a period of time, a frequency of job executions, a recency of job executions, a trend of job executions over a period of time, a volume of data processed, or a trend in volume of data processed over a period of time; and
wherein the one or more customer parameters comprise one or more of: an age of an account associated with the customer, a duration of usage of the product by the customer, a level of investment in the product by the customer, a segment of the customer, customer renewal patterns, customer financial strength, or a situational factor.

* * * * *